United States Patent [19]
Gorsky

[11] 4,118,882
[45] Oct. 10, 1978

[54] FISH BITE INDICATOR

[75] Inventor: Peter Gorsky, Prosperity, W. Va.

[73] Assignee: The Raymond Lee Organization, Inc., New York, N.Y. ; a part interest

[21] Appl. No.: 788,744

[22] Filed: Apr. 19, 1977

[51] Int. Cl.² .............................................. A01K 97/12
[52] U.S. Cl. ........................................ 43/17; 43/25; 200/61.18; 362/109
[58] Field of Search ...................... 43/17, 25, 16, 17.1, 43/17.5; 362/109; 340/279; 200/61.13, 61.18

[56] References Cited

U.S. PATENT DOCUMENTS

| 2,549,694 | 4/1951 | Leyda | 43/17 |
| 3,702,513 | 11/1972 | Watts | 43/17 |
| 3,740,887 | 6/1973 | Van Leeuwen | 362/109 |
| 3,868,668 | 2/1975 | Woodbury | 43/17 |
| 4,006,550 | 2/1977 | Rizzo | 43/17 |

FOREIGN PATENT DOCUMENTS 565,504 10/1973 Switzerland ................................ 43/17

Primary Examiner—N. P. Godici
Attorney, Agent, or Firm—Howard I. Podell

[57] ABSTRACT

Fishing rod attachment, through which fishing line is passed, responsive to the tension in line developed by the pull of a fish caught on the line, which attachment includes an indicating light that is turned on when the line is under tension. The reverse motion of reeling the line back is not impeded by the attachment.

3 Claims, 7 Drawing Figures

FISH BITE INDICATOR

SUMMARY OF THE INVENTION

The purpose of the invention is to provide an indicator signaling a fish bite, on a line of an attached fishing rod fitted with reel means. The invention does not interfere with the normal operation of the fishing rod assembly, in a novel way, by designing a specialized clamping device through which the fishing line is fed, the clamping device having a unidirectional clamping action.

BRIEF DESCRIPTION OF THE DRAWINGS:

The objects and features of the invention may be understood with reference to the following detailed description of an illustrative embodiment of the invention, taken together with the accompanying drawings in which.

Figure 1:
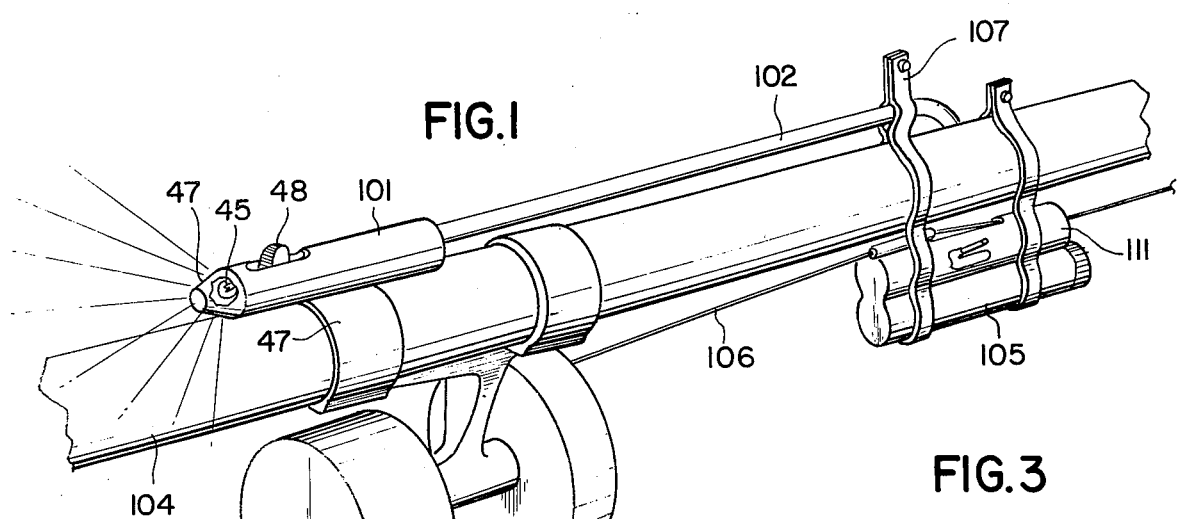
FIG. 1 is an isometric view of the invention applied to a fishing rod.

DESCRIPTION OF THE PREFERRED EMBODIMENT:

Turning now descriptively to the drawings, in which similar reference characters denote similar elements throughout the several views, FIG. 1, illustrating with a general view the application of the invention, shows a conventional fishing rod 104 with attached reel assembly 103 upon which fishing line 106 is wound, in spatial relationship with newly added elements cooperating within the invention, namely, indicator light assembly 101, electrical wire conduit 102, leading to clamp assembly 111 and battery holder assembly 105 that are fastened by straps 107 to rod 104.

Fishing line 106, seen on FIGS. 1, 3, 4 and 5, passes through guide tube 12 externally mounted to clamp assembly 111 and passes into clamp assembly 111 through opening 21.

The clamp assembly 111 is build with outer tube 11, closed at its forward end by pierced cylinder cap 14 and at its rear end by cylinder cap 19, in the bore 26 of which inner tubular cylinder 15 and end cap compression are slidably mounted to spring 13.

Line clamp pin 16 and compression spring 17 are slidably mounted in the bore 31 of cylinder 15, with compression spring 17 mounted to bias pin 16 in the forward direction, with spring 17 bearing against rear cap 18, threaded in the rear section of bore 31. An electrical contact actuator arm 4 is externally fixed to the rear end of cap 18 by a screw 10. The forward end of pin 16 is formed with a tapered point tip 32 that engages an axial beveled opening 33 in the forward wall 34 of tubular cylinder 15.

An opening 36 is formed in the side wall 37 of tubular cylinder 15 located adjacent opening 21 of tube 11.

Spring 13 is located to bias tubular cylinder 15 in the rearwards direction away from outlet opening 38 of cylinder cap 14.

Figures 6, 7:
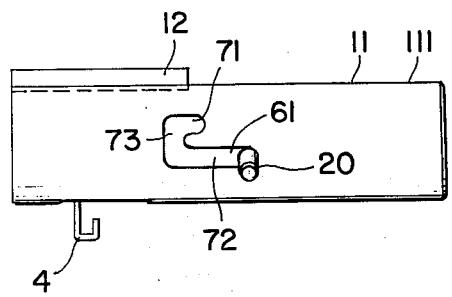
FIG. 6 is section view taken along line 6-6 of FIG. 3.
FIG. 7 is a section view taken along line 7-7 of FIG. 4.
Figure 5:
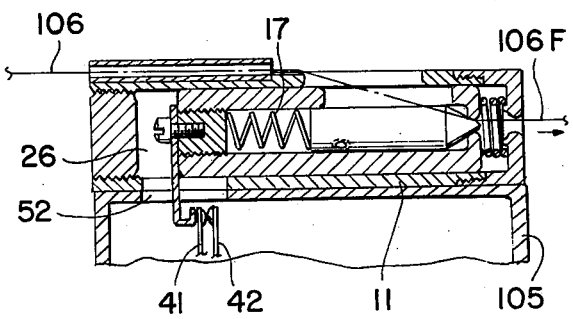
FIG. 5 is a section of FIG. 2, with the clamp unit actuated by a fish bite on the fishing line.

Fishing line 106 is led through guide tube 12, openings 21 and 36 into the bore 31 of cylinder 15 forward of tip 32 of pin 16 and out through openings 33 and 38 to beyond the tip of the fishing rod in the normal set position of use shown in FIG. 5 with spring 17 biased to apply a moderate frictional engagement of tip 32 against line 106, to permit line 106 to be freely reeled in through the clamp assembly 11 to the reel 103 but which acts to clamp tip 32 against line 106 and line 106 against the beveled rim of opening 33 so as to draw cylinder 15 forwards, when forward section 106F of 106 is pulled forwards by the action of a fish bite, as shown in FIG. 7.

Battery case 105 is formed of a size to contain one or more batteries (not shown) which are electrically connected in case 105 through spring switch contacts 41, 42 to wires in conduct 102 that lead to an indicating light 45 in light assembly 101 mounted by straps 47 to the rod 104, with light 45 enclosed by a transparent cap 47. A switch 48 mounted to light assembly 101 is connected in series with the light 45.

Figure 4:
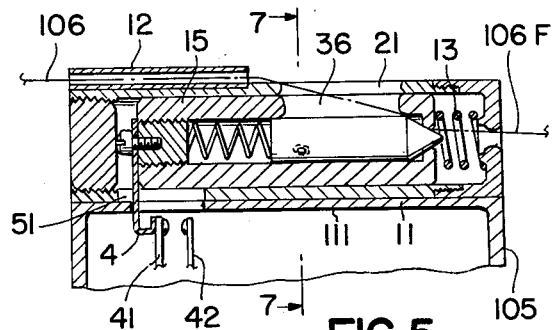
FIG. 4 is partial section of FIG. 2, with the clamp unit in the operating position.

Actuator arm 4 projects through an opening 51 in tube 11 and an opening 52 in battery case 105 into the interior of the battery case, with switch contacts 41 and 42 located so as to be bent into electrical contact when actuator arm 4 is in the forward position of travel, of cylinder 15 as shown in FIG. 5, with contacts 41 and 42 biased to separate when arm 4 is in the rear position of travel as shown in FIG. 4.

As shown in FIGS. 3, 5-7, a J-shaped through slot 61 is formed in the side wall of tube cylinder 11 with a longitudinal shaped slot 62 formed in the side wall of cylinder 15, and with a detent pin 20 radially fixed to clamp pin 16 that projects through both slots 61, 62.

Figures 2, 3:
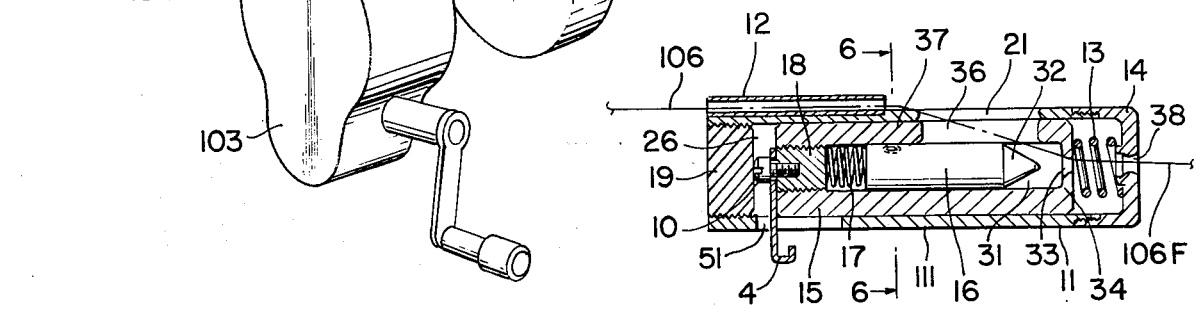
FIG. 2 is an elevation of the clamp unit of the invention.
FIG. 3 is partial section of FIG. 2, with the clamp unit in the lock-out position.

Slot 61 is formed with a short leg 71 and a long leg 72 both oriented in the axial direction of travel of clamp pin 16 and joined at their rear by a transverse slot section 73, with slot leg 72 of a length to permit free travel of pin 16 in the normal set position, when detent pin 20 is manually located in leg 72 and with slot leg 71 retaining clamp pin 16 and cylinder 15 in the rearward position as shown in FIG. 3, when detent pin 20 is manually located in short leg 71, so as to permit casting of line 106 freely of frictional engagement with clamp pin 16.

In use, clamp pin 16 is disengaged by manually moving detent pin 20 into slot leg 71 during casting of the fishing line or when additional line is to be unwound from reel 103 as shown in FIGS. 3 and 6. After the line has been set in position for fishing, detent pin is manually moved into long slot leg 72 to permit clamp pin to frictionally engage line 106, with cylinder 15 retained in the rearward position as shown in FIGS. 4 and 7. The pull on forward end 106F of the line 106 when a fish bites causes clamp pin 16, cylinder 15 and detent pin 20 to move forwards, causing arm 4 to close switch contacts 41, 42 so as to cause light 45 to be illuminated so as to indicate the bite of the fish and so as to apply frictional resistance to the forward travel of line 106 through the clamp assembly.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An assembly attachable to a fishing rod for indicating the pull of a fish, caught on the fishing line of the rod comprising, a clamp unit fitted with straps for attachment to a fishing rod, said clamp unit formed of a clamp pin slidably mounted in the bore of an inner hollow member which said inner hollow member is mounted in the bore of an outer hollow member with first spring means to bias the pin in the forward direction relative to the said inner member, and second spring means to bias the said inner member in the rearward direction relative to the said outer member, with a first set of openings located in the sides of both members and a second set of openings located within the forward walls of both members of a size to permit a fishing line to pass through the interior of the inner member from said first set of openings and to exit through the said second set of opening between the forward end of the clamp pin and the opening in the forward wall of the inner member, together with signal indicating means fixed to said inner member located to indicate when said inner member is pulled forward relative to said outer member against the bias of said second spring means.

2. The combination as recited in claim 1 in which the clamp pin is fitted with detent means to permit latching the clamp pin in a position which limits the forward travel of said clamp pin.

3. The combination as recited in claim 1 in which the forward end of the clamp pin is of a conical shape and the forward opening of the inner hollow member is of a matingly beveled shape, with the said forward end of the clamp pin engaging the said forward opening of the inner hollow member in the normal position of use, under bias of said first spring means.

* * * * *